(No Model.)
G. B. SNOW.
DENTAL VULCANIZER.
No. 499,602. Patented June 13, 1893.
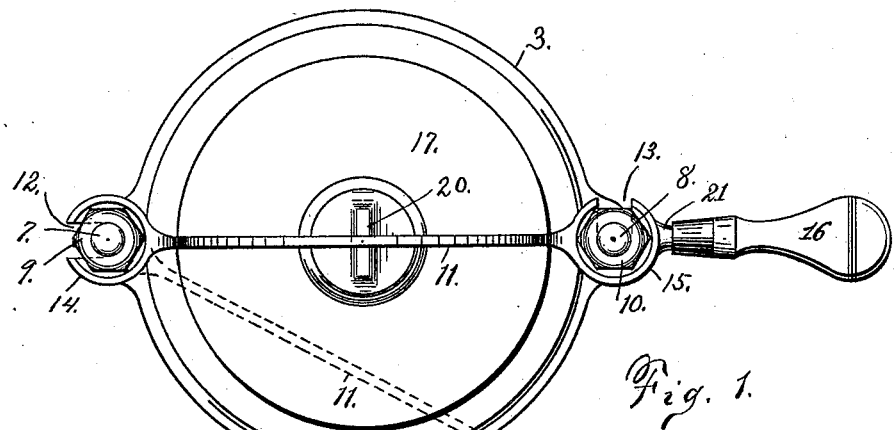
Fig. 1.
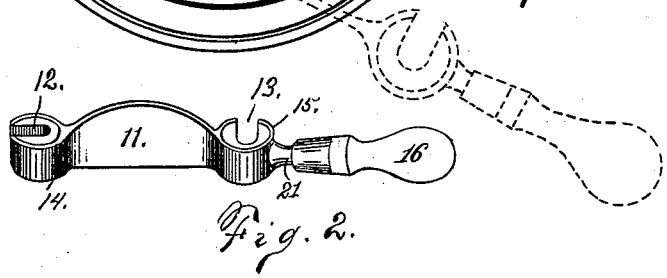
Fig. 2.
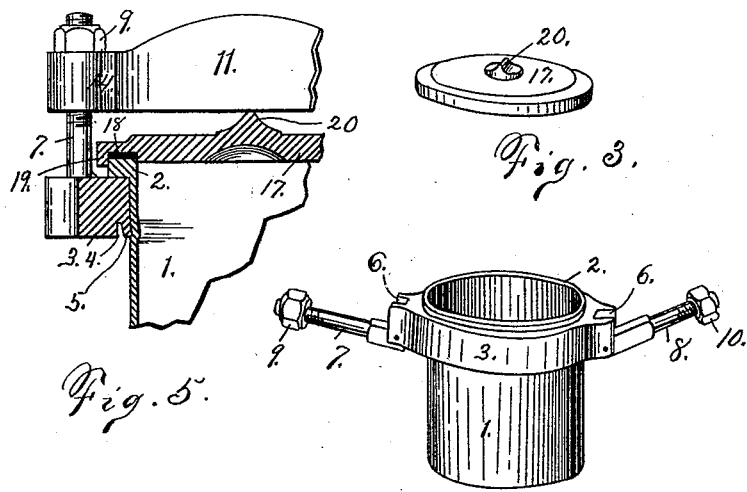
Fig. 5.
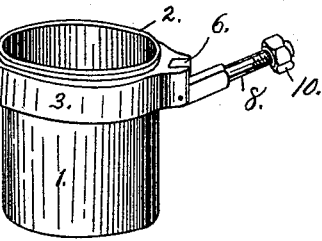
Fig. 3.
Fig. 4.
WITNESSES:
George B. Bassett.
Edward M. Bassett.
INVENTOR
George B. Snow.
BY O. E. Hoddick.
ATTORNEY

UNITED STATES PATENT OFFICE.

GEORGE B. SNOW, OF BUFFALO, NEW YORK.

DENTAL VULCANIZER.

SPECIFICATION forming part of Letters Patent No. 499,602, dated June 13, 1893.

Application filed July 8, 1891. Serial No. 398,833. (No model.)

*To all whom it may concern:*

Be it known that I, GEORGE B. SNOW, a citizen of the United States, residing at Buffalo, Erie county, New York, have invented certain new and useful Improvements in Dental Vulcanizers, of which the following is a full, clear, and exact specification.

This invention relates to dental vulcanizers and has for its object to provide the vulcanizing pot with a clamping cross-bar extended at one end into a grasping handle in such manner that while the cross-bar serves to tightly close the pot cover, its extension handle enables the vulcanizer to be lifted, carried and otherwise manipulated.

To accomplish this object my invention involves the features of construction and the combination or arrangement of devices hereinafter described and claimed, reference being made to the accompanying drawings, in which—

Figure 1, is a top plan view of a dental vulcanizer provided with my invention. Fig. 2, is a detail perspective view of the clamping cross-bar. Fig. 3, is a detail perspective view of the pot cover. Fig. 4, is a detail perspective view of the vulcanizer pot, and Fig. 5, is a detail sectional view to more clearly illustrate the manner of attaching the collar or ring to the pot.

In order to enable those skilled in the art to make and use my invention I will now describe the same in detail referring to the drawings wherein the numeral 1 indicates a vulcanizing pot provided at its mouth with a square edged rim 2 adapted to enter an annular recess in the pot cover 17 and produce a tight joint therewith. The pot is provided directly beneath the square edged rim 2 with a collar or ring 3 having diametrically arranged sockets 6 in which are respectively pivoted the lower extremities of a pair of swinging bolts 7 and 8 constructed with screw threaded upper extremities on which screw nuts 9 and 10, are mounted. The collar or ring 3 is preferably secured in position by forming it with an annular groove 4 in its lower surface to provide a thin edge 5 which is susceptible of being upset and driven into close contact with the side of the pot. The swinging bolts 7 and 8 are of such length that when perpendicular they project above the pot cover 17 and are adapted to connect with a clamping cross-bar 11 which is formed at one end with a slot 12 to receive the bolt 7 and at the opposite end with a slot 13 to receive the bolt 8. The slots are formed in lateral enlargements 14 and 15 of the cross-bar and these slots extend at right angles to each other. The slot 12 opens longitudinally with reference to the cross-bar and the slot 13 opens laterally, in such manner that the slot 12 of the cross bar can be engaged with the bolt 7 while the cross bar is in the position indicated by dotted lines Fig. 1 and then the cross bar can be swung laterally to cause the slot 13 to engage the bolt 8, after which the bolts 9 and 10 are tightened up by a suitable instrument for the purpose of causing the cross bar to press on a central projection 20 of the pot cover and thereby clamp such cover tightly against the rim 2 of the pot. The annular groove 18 in the pot cover Fig. 5, is preferably provided with a packing 19 to secure a steam tight joint.

When it is desired to close the pot, the pot cover is properly adjusted and the clamping cross bar is laid thereupon in the position indicated by dotted lines Fig. 1. The bolt 7 is raised to a perpendicular position and engaged with the slot 12 and then the bolt 8 is also raised and the clamping bar is swung laterally into the position shown by full lines Fig. 1. The nut 9 having been previously adjusted to the required position it is only necessary to tighten the nut 10 to clamp the cover on the pot and render the joint steam tight. If the nut 9 is not properly adjusted so that the bar assumes a position parallel with the pot cover, such nut may be turned with the thumb and finger and the cover then clamped in place by tightening the nut 10. But even if this operation is not performed the bolts will accommodate themselves so that the nuts bear squarely upon the clamping bar and any injurious side strain upon the parts is avoided. To promote this action, the clamping bar is susceptible of sliding longitudinally upon the projection 20 of the pot cover. The lateral enlargement 15 of the clamping bar 11 is formed integral with a longitudinally projecting shank 21 on which is mounted a grasping handle 16 for the purpose of manipulating the cross bar and also conveniently lifting and carrying the vulcanizer when the cover is clamped in position thereto. This longitudinal extension of the clamping cross bar into a grasping handle 16, for the purpose of lifting, carrying and otherwise manipulating the vulcanizer is a very desirable feature of my invention which will recommend itself to dentists or others having occasion to use dental vulcanizers.

Having thus described my invention, what I claim is—

The combination with a vulcanizing pot having a collar or ring provided with oppositely arranged sockets 6, and a pot cover 17 having a projection 20, of swinging bolts 7 and 8 pivoted in the sockets of the ring or collar and having screw nuts 9 and 10, and a cover-clamping cross-bar 11 provided at its ends with slots 12 and 13 to receive the swinging bolts and having one end extended into a grasping handle 16 for lifting and carrying the pot when the cover is clamped thereupon, substantially as described.

In testimony whereof I have signed my name to this specification in the presence of two subscribing witnesses.

GEORGE B. SNOW.

Witnesses:
O. E. HODDICK,
WM. D. VAN PELT.